US008280564B2

(12) United States Patent
Sacle et al.

(10) Patent No.: US 8,280,564 B2
(45) Date of Patent: Oct. 2, 2012

(54) METHOD FOR OPTIMIZING THE EXIT OF AN AIRCRAFT IN A HOLDING CIRCUIT

(75) Inventors: Jérôme Sacle, Toulouse (FR); Manuel Gutierrez-Castaneda, Toulouse (FR)

(73) Assignee: Thales, Neuilly Sur Seine (FR)

( * ) Notice: Subject to any disclaimer, the term of this patent is extended or adjusted under 35 U.S.C. 154(b) by 787 days.

(21) Appl. No.: 12/113,255

(22) Filed: May 1, 2008

(65) Prior Publication Data

US 2009/0005918 A1 Jan. 1, 2009

(30) Foreign Application Priority Data

May 2, 2007 (FR) ..................................... 07 03159

(51) Int. Cl.
*G05D 1/00* (2006.01)

(52) U.S. Cl. .................. 701/4; 701/3; 701/12; 701/120; 701/527; 340/945; 340/973; 244/175

(58) Field of Classification Search ........................ None
See application file for complete search history.

(56) References Cited

U.S. PATENT DOCUMENTS

| | | | | |
|---|---|---|---|---|
| 2,522,029 | A * | 9/1950 | Field et al. | 340/989 |
| 5,214,855 | A * | 6/1993 | Gibbs | 33/1 SD |
| 5,844,503 | A * | 12/1998 | Riley et al. | 340/945 |
| 6,167,627 | B1 * | 1/2001 | Wilder et al. | 33/1 SD |
| 6,847,866 | B2 * | 1/2005 | Gaier | 701/4 |
| 7,152,332 | B1 * | 12/2006 | Jain et al. | 33/1 SD |
| 7,370,790 | B2 * | 5/2008 | Martincikova et al. | 235/61 NV |
| 7,546,206 | B1 * | 6/2009 | Miller et al. | 701/415 |
| 7,720,630 | B1 * | 5/2010 | Miller et al. | 702/150 |
| 2002/0193915 | A1 * | 12/2002 | Miller | 701/3 |
| 2004/0122567 | A1 * | 6/2004 | Gaier | 701/4 |
| 2005/0004745 | A1 * | 1/2005 | Rumbo et al. | 701/200 |
| 2005/0012642 | A1 | 1/2005 | Sacle | |
| 2006/0012492 | A1 * | 1/2006 | Degidio | 340/971 |
| 2007/0050101 | A1 | 3/2007 | Sacle et al. | |
| 2007/0129855 | A1 * | 6/2007 | Coulmeau | 701/3 |
| 2008/0162092 | A1 | 7/2008 | Coulmeau et al. | |

FOREIGN PATENT DOCUMENTS

WO WO 2004/059252 7/2004

OTHER PUBLICATIONS

U.S. Appl. No. 12/066,499, filed May 28, 2008, Sacle et al.
U.S. Appl. No. 12/041,731, filed Mar. 4, 2008, Sacle et al.
U.S. Appl. No. 12/121,086, filed May 15, 2008, Sacle et al.
U.S. Appl. No. 12/129,212, filed May 29, 2008, Sacle et al.
U.S. Appl. No. 12/208,461, filed Sep. 11, 2008, Coulmeau et al.

* cited by examiner

*Primary Examiner* — Khoi Tran
*Assistant Examiner* — Jonathan L Sample
(74) *Attorney, Agent, or Firm* — Lowe, Hauptman, Ham & Berner, LLP

(57) ABSTRACT

The method of optimizing the exit of an aircraft traversing for a known duration (D) a holding circuit forming a racecourse comprising two parallel branches of the same distance, the branches being traversed in a first time (t1), and two arcs of the same radius linking respectively the ends of each branch, the two arcs being traversed in a second time (t2), the holding circuit comprising an exit point situated at the end of one of the branches is characterized in that the distance of the branches of the holding circuit for the last two loops performed are adjusted so that the aircraft is substantially in proximity to the exit point when the duration (D) has elapsed.

7 Claims, 3 Drawing Sheets

METHOD FOR OPTIMIZING THE EXIT OF AN AIRCRAFT IN A HOLDING CIRCUIT

RELATED APPLICATIONS

The present application is based on, and claims priority from, French Application Number 07 03159, filed May 2, 2007, the disclosure of which is hereby incorporated by reference herein in its entirety.

FIELD OF THE INVENTION

The present invention relates to the field of holding procedures for an aircraft flying a holding circuit generally situated in proximity to an airport before commencing the final approach to its landing at a given time. More particularly, it relates to methods making it possible to optimize aircraft exit from a holding circuit.

BACKGROUND OF THE INVENTION

The air traffic controller, also called ATC, the acronym standing for "Air Traffic Control", generally gives the crew of an aircraft a start-of-approach time so that they apply the approach procedure at the opportune moment. It may happen that the traffic around an airport is saturated, the traffic and/or the congestion of the runways not making it possible to satisfy a landing at the initially indicated time.

Certain situations then induce the air traffic controller to request certain aircraft to fly a holding circuit for a duration deduced from the time of final approach to be performed. The approach time generally being denoted SAT, standing for "scheduled approach time", this resulting in a holding circuit exit time. To satisfy the flight conditions of a holding circuit in complete safety, functions, called "HOLD functions", are provided for by the "Arinc 424" standard in certain terminal procedures. They make it possible notably to manage aircraft holding for a predetermined duration in a holding circuit. Conventional flight management means of the aircraft such as an FMS, the acronym standing for "Flight Management System", make it possible within this framework to manage a holding circuit exit time so as to commence the landing procedure.

Currently, the air traffic controller can request an aircraft to stop its HOLD procedure so as to exit therefrom. In this case, it is up to the pilot to extrapolate the holding circuit exit instruction as a function of the position of the aircraft in the holding circuit at the present instant so as to calculate the optimal trajectory of the aircraft in order to be as close as possible to the exit point at the indicated time.

Generally, the holding circuit, bearing the same name as the HOLD function, has the form of a racecourse comprising two circular arcs, which can substantially be two half-circles, and two branches forming two parallel straight lines linking the ends of each half-circle.

Hereinafter, one of the two parallel straight lines of a holding circuit which links one circular arc to another will be called a branch of a HOLD.

The holding circuit furthermore comprises an exit point and an entry point which can be substantially the same or be opposite in the holding circuit as the case may be. Generally they are situated at the ends of one of the branches of the holding circuit, therefore just before a turn. These points can be tagged with respect to a beacon in proximity to the airport and their coordinates are known in latitude and longitude.

The branches forming straight lines of the holding circuit, in main airports, are normally traversed over a duration of 1 or 1.5 minutes. Certain holding circuits have straight segments defined by a distance that is easily measurable in flight with a navigation instrument. This convention allows the crew to express the distances in the form of temporal constraints. When they fly the holding circuit at constant speed the crew therefore obtains simple temporal tags to attain the exit point of the holding circuit.

These two branches are therefore generally flown at constant speed in a regime making it possible to optimize consumption. The branch on which the aeroplane arrives is called the "inbound leg" and the other branch parallel to the latter is called the "outbound leg"

Numerous patents describe aircraft entry or exit procedures when said aircraft flies a holding circuit.

Patent application WO 2004/059252 describes notably the entry and exit pattern of an aircraft when the latter enters and leaves a holding circuit. But an aircraft's holding circuit exit procedure is not automated, the air traffic controller gives the aircraft crew an indication such as the exit time such that the aircraft attains the exit point of the circuit as quickly as possible. In this case the aircraft crew calculates approximately the trajectory of the last loop so as to be at the exit point of the holding circuit at the time indicated by the air traffic controller.

Currently, no automatic predictability exists making it possible to optimize the form of the holding circuit in the last loops so that the aircraft is at its exit point at the known exit time. Currently, depending on the knowledge of the situation of the aircraft, the air traffic controller must estimate the moment at which the aircraft must decide to leave the HOLD, assuming that it will be reinserted into the traffic a few minutes later. The air traffic controller must also give or confirm the exit HOLD instruction to the crew in the last loop of the holding circuit.

It is possible today to input a time constraint on the exit point of a holding circuit, that is to say a time at which the aircraft must be at its exit point. This allows the air traffic controllers to give the aircraft the exact time at which it must reinsert itself into the traffic in advance. On the other hand, when the aircraft enters the holding circuit, the flight plan is not capable of adapting to comply with the constraint, since the size of the holding circuit, notably the portions of branches of the racecourse, are fixed.

Currently, the time constraint given to the crew regarding exit from holding circuits only allows the function to give the crew a prediction to tell them whether "yes" or "no", the constraint will be complied with. The pilot is not aided or assisted in optimizing his trajectory so as to be at the exit point of the holding circuit at the end of the time constraint.

Notably, in certain aircraft, the FMS predicts only that the aircraft will or will not finish the loop of the holding circuit commenced (with the initial fixed size), by specifying whether it must leave the holding circuit and embark on the rest of the flight plan or whether it must continue one more loop of the holding circuit.

It is common for aircraft to be placed on hold at the end of descent or the start of approach on a holding circuit, doing so in order to reinsert themselves appropriately into the final approach traffic.

The drawback of the existing solutions is that in no case can the flight plan accommodate the time constraint given by the air traffic controllers. Insertion into the traffic then remains approximate as regards compliance with the temporary constraint by the crew.

Pilots can use an empirical formula to calculate a postponement time to satisfy the time constraint. The latter calculation remains complex and precision is not guaranteed according to the direction of the wind and of the last loop of the holding circuit which can sometimes be flown in "heading hold" mode by hand to return to the exit of the holding circuit at the right moment. Generally the workload takes up the entire resource of the pilot.

SUMMARY OF THE INVENTION

The method according to the invention proposes to automate the generation of a variable size of the inbound and the outbound leg, that is to say of the parallel branches of the holding circuit, of the last loops of the holding circuit which depend on the time constraint. The time constraint is expressed either by the circuit exit time, or by the duration remaining to be flown of the holding circuit before going to the exit point.

The reduction in the distance of the branches relates at best, according to the method of the invention, to the last and the penultimate loop of the holding circuit performed by the aircraft. It is considered that the margin of manoeuvre, so that the aircraft is at its exit point at a given time when it flies a holding circuit, can be included in the modification of the forms of the last two holding circuits, notably of the distance of their branches.

The method according to the invention proposes following entry of a time constraint for exit from a holding circuit, to adapt the trajectory to be flown by automatically recalculating the last two loops in such a way that the aircraft is substantially at its exit point when the time constraint is reached.

The objective is to consider a form of the holding circuit, therefore of the HOLD, not exceeding the airspace volume allocated to the holding circuit.

The main advantage of this method is to precisely satisfy the insertion of the aircraft into the air traffic on exit from a HOLD procedure.

An aim of the invention is notably to alleviate the aforesaid drawbacks.

For this purpose, the subject of the invention is a method of optimizing the exit of an aircraft traversing for a known duration ($D_0$) a holding circuit forming a racecourse comprising two parallel branches of the same distance, the branches being traversed in a first time (t1), and two arcs of the same radius linking respectively the ends of each branch, the two arcs being traversed in a second time (t2), the holding circuit comprising an exit point situated at the end of one of the branches, characterized in that the distance of the branches of the holding circuit for the last two loops performed is adjusted so that the aircraft is substantially in proximity to the exit point when the duration ($D_0$) has elapsed.

Advantageously, the last two loops of the holding circuit are identical.

Advantageously, the last loop is a circle.

Advantageously, the method comprises:

- a first step of determining a duration D corresponding to the duration between the aircraft's first pass and the last pass through the exit point;
- a second step of calculating the number of whole loops of the holding circuit remaining to be traversed before reaching the exit point after a duration D, the number of whole loops being denoted n and corresponding to the integer part of D/(t1+t2);
- a third step of determining the number of loops of the holding circuit, the length of whose branches is modified, this number being less than 3;
- a fourth step of calculating the length of the branches of the last two loops.

Advantageously, the third step comprises the comparison of the value of a remaining duration R with the value of the duration t2, the duration R arising from the difference between the duration D and the duration corresponding to the elapsed time to cover the maximum of whole loops of the racecourse, this difference being equal to [D−n·(t1+t2)]

Advantageously, the fourth step defines in

- a first case, where the remaining duration R is greater than or equal to the second time t2, a second duration P equal to the difference between the remaining duration R and the second time t2, such that the last loop is formed of two circular arcs, the whole being performed in a time t2 and two portions of branches performed in a duration shortened by half the second time, i.e. P/2;
- a second case, where the remaining duration R is less than the second time t2, a third duration $P_1$, such that the penultimate and the last loop are performed for shortened and equal durations, the two arcs of each loop being traversed in a time t2 and each shortened branch of the last two loops is performed in a time $P_1$ equal to $$\frac{D-(n-1)(t1+t2)}{4}-\frac{t2}{2}.$$

Advantageously, the fourth step defines in

- a first case, where the remaining duration R is greater than or equal to the second time t2, a fourth duration P equal to the difference between the remaining duration R and the second time t2, such that the last loop is formed of two circular arcs performed in a time t2 and two portions of branches performed in a duration shortened by half the second duration, i.e. P/2;
- a second case, where the remaining duration R is less than the second time t2, a fifth duration $P_2$ such that the last loop of the holding circuit is performed for a shortened duration equal to t2 corresponding to the traversal of the two circular arcs and a penultimate loop comprising two branches each traversed in a duration $P_2$ equal to $$\frac{D-(n-1)(t1+t2)}{2}-t2.$$

Advantageously, in its last loop, when the aircraft traverses the last turn of the holding circuit, a message advises the crew that exit is imminent.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Figure 1:
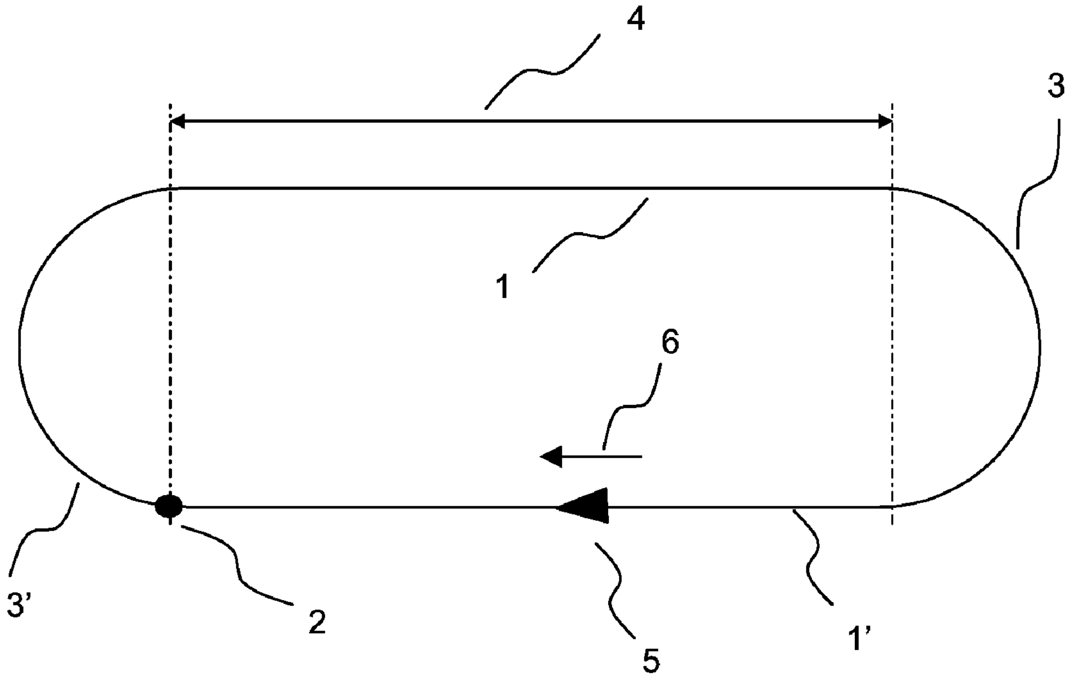
FIG. 1: an exemplary holding circuit of "racecourse" type.

FIG. 1 presents a holding circuit having substantially the form of a racecourse. It comprises two circular arcs 3, 3' which in this example are half-circles and two parallel branches 1, 1'.

It furthermore comprises an exit point 2 allowing an aircraft 5 to exit the circuit to join the traffic of the final approaches on conclusion of a elapsed holding duration.

A direction of rotation convention is applied in all holding circuits, in the example of FIG. 1, the aircraft 5 flies in a roundabout direction 6.

The nominal size of a holding circuit, called HOLD, is generally calculated for an aircraft nominal speed authorized in a holding procedure. A nominal HOLD is obtained in such a way that the aircraft flies, at constant speed, each of the branches joining one half-circle to the other in 1 min or 1 min 30 s according to the typical cases of holding circuits.

The holding circuit, called HOLD, has a minimum size corresponding to a trajectory formed of two half-circles, the branches then have a zero distance. In this case the aircraft makes a whole loop.

For safety, a maximum size can be defined in such a way that the aircraft does not deviate from a maximum distance of a nominal HOLD.

In a holding procedure, the aircraft flies the holding circuit at constant speed. A time constraint is generally communicated to it by the air traffic controller to go to the exit point 2 after the elapsing of a holding duration $D_0$ corresponding to the difference between the local time of the request for example and the time constraint.

The initial point of the countdown of the duration $D_0$ can be taken at the entry point to the holding circuit as reference subsequently in the document knowing that a simple operation would make it possible to retrieve this point starting from another position of the aircraft in space.

It is equivalent to consider a holding circuit exit time and a holding circuit flight duration, one of the two parameters automatically defining the other.

In an implementation of the invention the pilot inputs the time constraint, also called RTA, into the FMS. When the aircraft is in the holding circuit, its position being known at each instant, the FMS can automatically calculate the trajectory of each loop of the holding circuit so that the aircraft is at the exit point when the holding duration $D_0$ has elapsed.

For this purpose, the method according to the invention proposes initially to evaluate the number of whole HOLD loops having a nominal size when it is traversed for a holding duration D, the duration D having an initial point of simple countdown for the calculations. Moreover it is necessary in all typical cases to consider a duration D whose countdown begins when the aircraft is in the holding circuit. It is therefore necessary to define without ambiguity an initial point of the countdown of the duration D, knowing that the final point is the exit position. It is possible to choose the first pass through the exit point in the holding circuit as initial instant of the countdown of the duration D.

The duration $D_0$–D corresponds to the distance necessary for the aircraft to attain the exit point of the HOLD for a first time when said point is situated at the point of entry to the HOLD.

If the crew of the aircraft enters the instruction $D_0$ into the FMS though it is not yet in the holding circuit, the duration between D and $D_0$ corresponds to the time elapsed to traverse the distance between the entry point of the holding circuit and the exit point during the first pass of the circuit.

The characteristics of the HOLD being known, this difference is easily deduced. Subsequently in the document consideration will be given to the duration D for the calculations so as to simplify the latter.

Typically it is considered that the aircraft traverses the two parallel branches in a time t1 and the two half-circles in a time t2. A whole HOLD loop is then performed for a duration t1+t2.

The minimum duration of the traversal of a HOLD, considering its minimum size, is then t2. This duration corresponds to the duration making it possible to fly the two half-circles with a nominal constant speed.

Knowing the total holding duration $D_0$ and therefore the duration D, the FMS is capable of calculating the number of whole loops of a nominal HOLD performed by the aircraft without transgressing the time constraint instruction. The number of whole loops is denoted n. It is equal to the integer value of the ratio of the total duration D for which the aircraft is placed on hold to the traversal time of a nominal HOLD: D/(t1+t2).

A first duration R results from the difference between the total holding duration D and the duration elapsed during the first n loops of the holding procedure, it is expressed in the following manner in seconds:

$$R=D-n\cdot(t1+t2);$$

The value of the duration R represents the time remaining to be flown in the holding procedure but not making it possible to perform a whole loop of a nominal HOLD.

According to the value of the remaining duration R, several cases of implementation are envisaged. These various cases correspond to a comparison of the value R with the duration t2 of the traversal of a minimum HOLD. There are three possible typical cases: the duration R is smaller than t2, the duration R is equal to t2, the duration R lies between t2 and (t1+t2).

t2 being the duration making it possible to traverse the two half-circles, if the duration R is equal to t2, the aircraft will perform a last loop in a duration equal to t2, that is to say it will perform a circle.

In this case, having regard to a reference initial position of the aircraft for calculating its position at the conclusion of the time constraint D, the aircraft will be at its exit position after having performed n first loops of a nominal HOLD, each being flown in a time t1+t2, and a last loop, the $n+1^{th}$ loop, of a minimum reduced HOLD flown in a time t2.

On the other hand, if the duration R lies between the duration of a minimum HOLD t2 and the duration of a nominal HOLD (t1+t2), the method according to the invention proposes to define a new size of the HOLD adapted in such a way that a last loop is flown in a time R. In this case the half-circles 3, 3' remain unchanged, the position of the exit point 2 remains invariant and the two parallel branches 1, 1' are reduced and equal during the last loop. The value of the flight time P of each branch 1, 1' is then (R–t2)/2. The re-dimensioning of the HOLD makes it possible to adapt a size of HOLD in such a way that the aircraft is situated at its exit point when the holding duration D has just elapsed.

The position of the exit point 2 being invariant, the position of the half-circle, one of whose ends is the exit point, also remains invariant.

In this case, having regard to a reference initial position of the aircraft for calculating its position at the conclusion of the time constraint D, the aircraft will be at its exit position after having performed n first loops of a nominal HOLD, each being flown in a time t1+t2, and a last loop, the n+1$^{th}$ loop, of a reduced HOLD comprising two reduced parallel branches. This last loop will be flown in a time R.

When the duration R is less than the time t2, the duration t2 corresponding to the time of traversal of the two half-circles, the aircraft cannot comply with the imposed time constraint since it is impossible for it to traverse a minimum HOLD in a duration of less than t2. The aircraft then cannot get to the exit point of the HOLD at the end of the elapsing of the holding duration D. For this purpose the method according to the invention proposes to re-dimension the last two holding circuits, called HOLD, and more particularly the length of the two parallel branches of the last two loops.

The latter typical case can be dealt with according to several embodiments.

A first embodiment consists in considering that the last two loops of the holding circuit, denoted HOLD, are identical.

Figure 2:
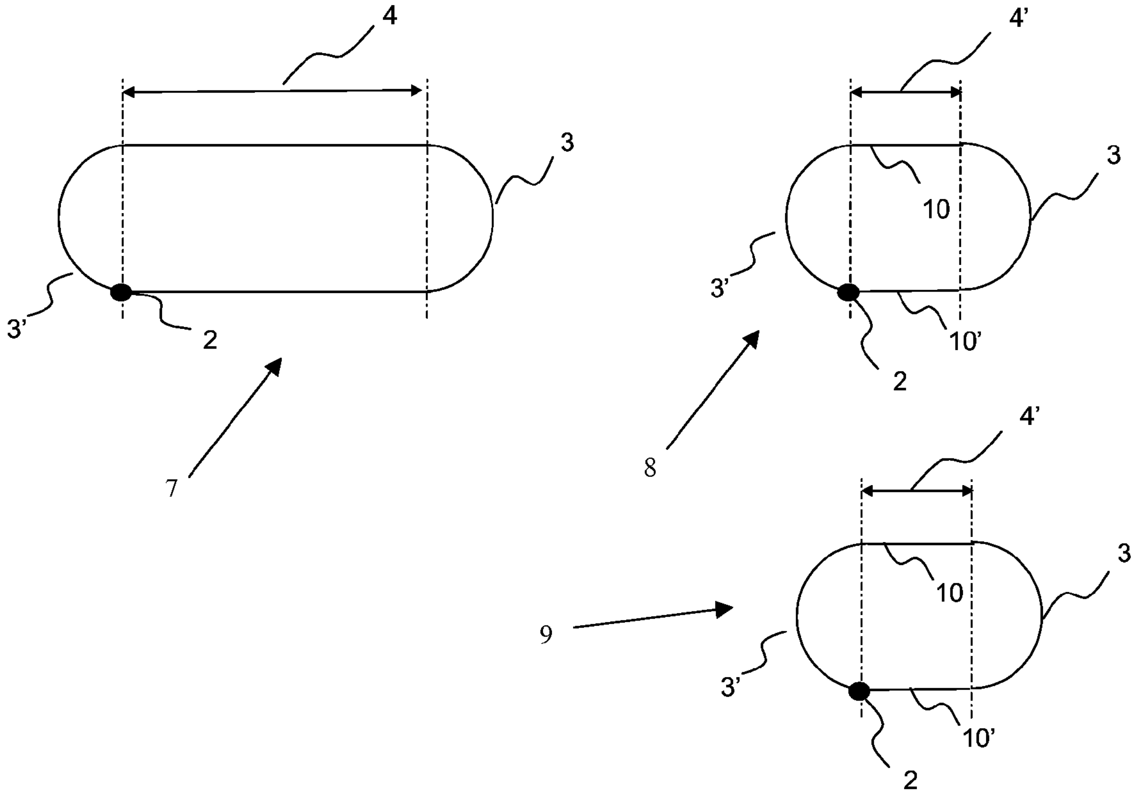
FIG. 2: a first example of a holding circuit and of the last two loops performed by the aircraft.

FIG. 2 represents the form 7 of a nominal HOLD that the aircraft flies during the first n−1 loops, they are identical. Furthermore, also represented are the last two loops of the holding circuit having identical reduced HOLD forms 8 and 9. Each of the last two HOLDs comprises reduced branches 10, 10' and unchanged half-circles 3, 3'. The length 4' of each of the branches of the last two loops is then reduced to satisfy the time constraint D after which the aircraft must be located at the exit point 2. The aircraft, advancing at constant speed in the holding circuit, traverses the portion 4' in less time than the portions 4 of the first n−1 loops.

It is specified that for each of the HOLD loops regardless of the size of the HOLD, the position of the exit point in space remains invariant and therefore the position of the half-circle 3' also remains invariant in space.

To satisfy the time constraint and the positioning at the exit point 2 of the aircraft, the method according to the invention allows the FMS to calculate the duration of traversal of the parallel branches of the last two HOLD loops.

This calculation can be carried out at any moment automatically as soon as the aircraft is in the holding circuit.

Knowing the position of the aircraft at an instant, the exit position of the HOLD and the duration that the aircraft must fly the holding circuit, the FMS is capable of calculating on the basis of a computer the form of the last two loops of the HOLD by extrapolation. More particularly, the FMS recalculates the flight duration for the parallel branches joining the half-circles and which are reduced.

Under these conditions a remaining duration R' for performing the last two loops of a re-dimensioned HOLD is the holding duration remaining after having performed n−1 first loops of a nominal HOLD. This is the case where R<t2.

We have the relation R'=R+(t1+t2).

$$R'=D-(n-1)\cdot(t1+t2);$$

Let $P_1$ denote the duration necessary to traverse at constant speed each of the branches joining the half-circles.

$$P_1=R'/2-t2,\ \text{i.e.}\ P=D/2-(n-1)\cdot(t1+t2)/2-t2;$$

In this case the aircraft traverses n−1 first loops of a nominal HOLD, each being traversed for a duration t1+t2 and two last loops of a reduced HOLD, each being traversed for a duration R'/2.

The advantage of such a method resides in the fact that the pilot inputs the time constraint after which the aircraft must be at the exit point. Within this framework the FMS can calculate at any moment the number of HOLD loops to be performed and notably it can adjust the size of the last loops to be performed to satisfy the positioning of the aircraft at the exit point at the end of the holding duration D and inform the pilot thereof.

In a second case of implementation, when the remaining duration R is less than the time t2 of traversal of the two half-circles, the last two HOLD loops can be different. Notably, one case may be to consider a last HOLD loop formed solely of the half-circles. The last holding loop therefore corresponds to a complete circle flown in a time t2.

Figure 3:
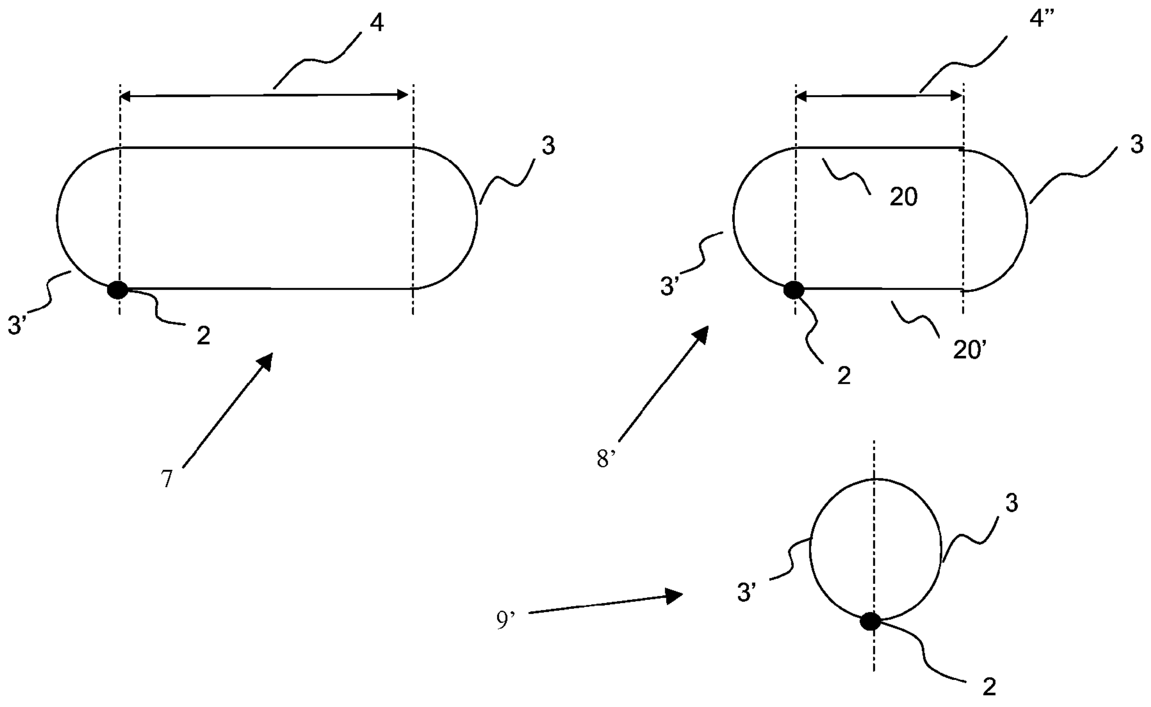
FIG. 3: a second example of a holding circuit and of the last two loops performed by the aircraft.

FIG. 3 represents in the latter case the first n−1 loops of the HOLD of form 7, then a reduced penultimate loop of form 8' whose characteristics will be determined hereinafter and finally a last loop representing a circle formed of the two half-circles 3, 3' traversed in a time t2.

Under these conditions the time remaining after the aircraft has performed n−1 loops of a nominal HOLD, is R'=D−(n−1)·(t1+t2) considering the previous notation.

Let $P_2$ denote the duration of each of the branches of the penultimate HOLD. It is equal to:

$$P_2=(R'-2\cdot t2)/2,\ \text{i.e.:}$$

$$P_2=D/2-[(n-1)\cdot t1+(n+1)-t2)]/2;$$

Under these conditions, the first n−1 loops are each performed in a time t1+t2;

the penultimate loop is performed in a time equal to:

$$D-[(n-1)\cdot t1+n\cdot t2)]$$

the last loop is performed in a time t2

Identically a case of implementation could be to consider that the penultimate HOLD is a circle formed of the two half-circles traversed in a time t2 and a last holding loop of a duration of:

D−[(n−1)·t1+n·t2)], each of whose branches joining the half-circles would be traversed in a duration $P_2$=D/2−[(n−1)·t1+(n+1)·t2)]/2.

The form of the racecourse of the holding circuit flown is always referenced with respect to an exit or entry point whose coordinates in latitude and longitude and in altitude are known to the FMS and to the air traffic controller, this point itself being tagged generally by a beacon in proximity to the airport.

The re-dimensioning of the form of the holding circuit in the method according to the invention leaves the position of the aircraft's exit point invariant. Depending on whether the exit point is at the entry to the turn 3' following the direction of rotation or to the turn 3, then the re-dimensioning of the HOLD leaves the position of the portion of arc concerned invariant, i.e. the half-circle 3' in the example.

In the case of implementation detailed above, on the basis of a total holding duration $D_0$, a second duration D is defined counted from the first pass of the aircraft through the exit point until its actual exit. This method is aimed at dispensing with the current position of the aircraft in the calculation of the number of loops of the HOLD and of their form at the moment when the pilot inputs the instruction into the FMS.

An equivalent case of implementation consists in processing not the duration D as above but the total duration $D_0$ directly. In this typical case the calculation is performed not at the first pass of the aircraft through the exit point but on the basis of its current position or of the point of entry to the holding circuit.

If the origin point of the countdown of the duration $D_0$ was chosen as the current position of the aircraft, the number of loops remaining and the form of the last two loops are calculated with the duration $D_0$ notably in the previous formulae by considering that the current position of the aircraft in the HOLD is known at this instant.

Whatever the position of the aircraft, notably whether or not it is already in the holding circuit, the method according to the invention can calculate the characteristics of the successive HOLDs while it is holding. To do so, if the aircraft has not yet entered its holding circuit, a time forecast of its entry into the holding circuit and of its entry point suffices to define the holding duration and therefore characteristics of the HOLDs, notably of the last two flown.

The method according to the invention proposes to keep the crew constantly informed of the calculation of the number of loops of the holding circuit to be made, notably of the characteristics of the last two loops, in particular of the length of the branches joining the two half-circles representing the turns. To do so viewing means such as those already employed to view the data of the FMS can be employed so as to cyclically warn of the position thereof in the holding circuit and of any deviation to be corrected.

Advantageously a message advises the pilot during his last turn that the exit point is imminent.

The main advantage of the invention is that of automatically determining the holding circuits, their characteristics and therefore the trajectories of the aircraft to be followed during a holding procedure of an aircraft when the latter is in proximity to an airport and is preparing to insert itself into final approach traffic at a precise time.

The pilot inputs the time constraint into the FMS, it being possible for said constraint to be transmitted by the air traffic controller at any moment. The FMS is then capable of determining the holding circuits to be flown notably their form and more particularly the last two circuits which may be shortened so that the aircraft is situated in the exit position at the end of the holding duration.

An advantage of such a solution resides in the availability offered to the pilot during the holding phase. Specifically, he no longer needs to perform an approximate calculation of the trajectory of his last holding circuit loop to ensure that the aircraft is situated in the exit position of the HOLD at the end of the time constraint.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. Method for optimizing an exit of an aircraft traversing, for a predetermined duration, a holding circuit forming a racecourse, said predetermined duration comprising a time constraint given by the air traffic controller (ATC) in advance for exit from the holding circuit and being defined by the duration remaining to be flown in the holding circuit before going to the exit point at the time constraint received by the aircraft from the ATC, said racecourse comprising two parallel branches of the same distance, the branches being traversed in a first time, t1, and two arcs of the same radius linking respectively ends of each branch, the two arcs being traversed in a second time, t2, the holding circuit comprising an exit point situated at the end of one of the branches, a loop of the holding circuit traversed by the aircraft being defined as starting and ending at the exit point, the method comprising:

automatically adjusting, using a computer during flight of the aircraft, the distance of the branches of the holding circuit for the last two loops traversed by the aircraft as a function of said predetermined duration so that the aircraft is substantially in proximity to the exit point when the predetermined duration has elapsed;

determining a duration D corresponding to a duration between a first pass of the aircraft and a last pass of the aircraft through the exit point;

calculating a number of whole loops of the holding circuit remaining to be traversed before reaching the exit point after a duration D, the number of whole loops being denoted by n and corresponding to the integer part of D/(t1+t2), wherein the number of whole loops is equal to or greater than one;

determining a number of loops of the holding circuit with a modified length, the number of loops of the holding circuit with a modified length being 1 or 2; and calculating the length of the branches of the last two loops.

2. Method according to claim 1, wherein determining the number of loops comprises the comparison of the value of a remaining duration R with the value of the second time t2, the duration R arising from the difference between the duration D and a duration corresponding to the elapsed time to cover the maximum of whole loops of the racecourse, this difference being equal to [D−n·(t1+t2)].

3. Method according to claim 1, wherein calculating the length of the branches defines in a first case, where a remaining duration R is greater than or equal to the second time t2, a second duration P equal to the difference between the remaining duration R and the second time t2, such that the last loop is formed of two circular arcs, the last loop being performed in a time t2 and two portions of branches performed in a duration shortened by half of the second duration, i.e. P/2;

a second case, where the remaining duration R is less than the second time t2, a third duration $P_1$, such that the penultimate and the last loop are performed for shortened and equal durations, the two arcs of each loop being traversed in a time t2 and each shortened branch of the last two loops is performed in a time $P_1$ equal to $$\frac{D-(n-1)(t1+t2)}{4}-\frac{t2}{2}.$$

4. Method according to claim 1, wherein calculating the length of the branches defines in a first case, where a remaining duration R is greater than or equal to the second time t2, a fourth duration P equal to the difference between the remaining duration R and the second time t2, such that the last loop is formed of two circular arcs performed in a time t2 and two portions of branches performed in a duration shortened by half of the fourth duration, i.e. P/2;

a second case, where the remaining duration R is less than the second time t2, a fifth duration $P_2$ such that the last loop of the holding circuit is performed for a shortened duration equal to t2 corresponding to a traversal of the two circular arcs and a penultimate loop comprising two branches each traversed in a duration $P_2$ equal to $$\frac{D-(n-1)(t1+t2)}{2}-t2.$$

5. Method according to claim 1, wherein the last two loops of the holding circuit are identical.

6. Method according to claim 1, wherein the distance of the parallel branches in the last loop is adjusted to be zero so that the last loop is a circle.

7. Method according to claim 1, wherein in the last loop, when the aircraft traverses a last turn of the holding circuit, a message advises a crew of the aircraft that exit is imminent.

* * * * *